United States Patent [19]
Constantini

[11] Patent Number: 5,299,329
[45] Date of Patent: Apr. 5, 1994

[54] HOT WATER CAMPING SHOWER

[76] Inventor: Mark Constantini, 7911 Fox Hollow Pl., Windsor, Calif. 95492

[21] Appl. No.: 985,294
[22] Filed: Dec. 4, 1992
[51] Int. Cl.⁵ .............................................. A47K 3/22
[52] U.S. Cl. ........................................ 4/597; 237/34; 126/350 A; 4/598
[58] Field of Search .................. 4/597, 598, 602, 603; 237/34; 126/350 A; 165/132, 41, 41.3, 42, 43; 244/134 B, 134 C

[56] References Cited

U.S. PATENT DOCUMENTS

| | | | |
|---|---|---|---|
| 2,894,265 | 7/1959 | Reardon | 4/598 |
| 3,381,316 | 5/1968 | Anderson | 4/597 |
| 3,417,920 | 12/1968 | Tyson | 237/34 |
| 3,431,565 | 3/1969 | Nelson | 4/598 |
| 3,521,704 | 7/1970 | Bridegum | 126/350 A |
| 4,260,103 | 4/1981 | Herring, Jr. | 237/34 |
| 4,893,364 | 1/1990 | Keeler | 4/597 |

*Primary Examiner*—Henry J. Recla
*Assistant Examiner*—Charles R. Eloshway
*Attorney, Agent, or Firm*—Larry D. Johnson

[57] ABSTRACT

A hot water camping or other outdoor shower releasably mounted to a motor vehicle utilizes water-to-water heat exchange through a heat exchanger mounted in-line with the vehicle heater core, and circulates the shower water with an electric water pump through removable hoses. The apparatus may use any source of water such as a lake or stream.

3 Claims, 1 Drawing Sheet

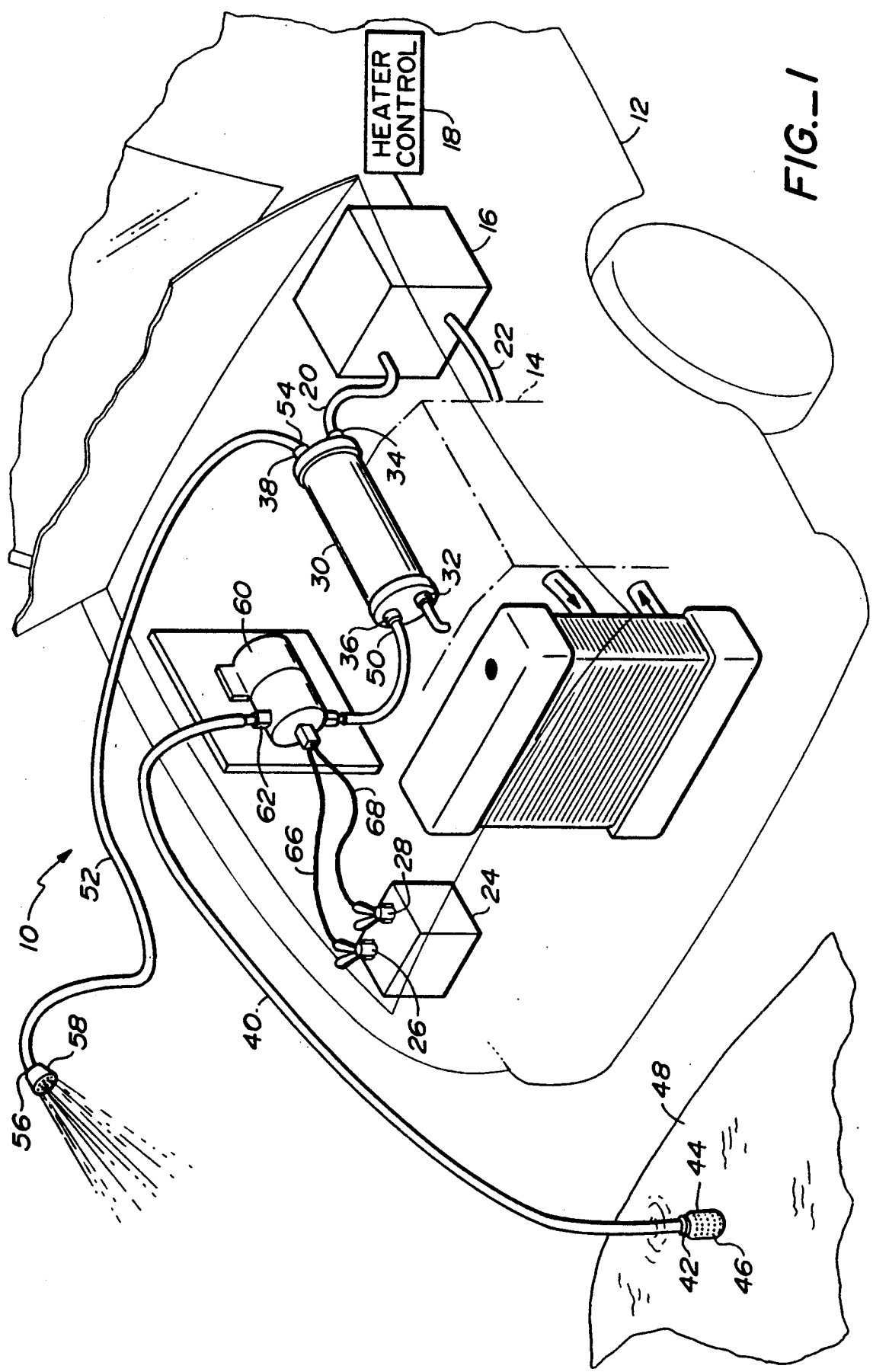

HOT WATER CAMPING SHOWER

BACKGROUND OF THE INVENTION

1. Field of the Invention

This invention relates generally to camping materials and associated outdoor equipment, and more specifically to an improved hot water camping or other outdoor shower apparatus utilizing a motor vehicle engine to provide heat for the shower water.

2. Description of the Prior Art

Camping and other outdoor recreational activities are a popular pastime. While it is often useful for the camper to be able to shower or bathe while outdoors, the water from most available natural water sources such as lakes and streams tends to be colder than desired by most campers. Accordingly, many campers either go through the trouble of heating small quantities of water on a fire or campstove for bathing and cleansing purposes, or they simply forgo bathing entirely.

With the advent of vehicle (car, truck and recreational vehicle) camping, some hot water systems utilizing water heated by the vehicle internal combustion engine have been developed. For example, Reardon U.S. Pat. No. 2,894,265 describes a water heating device that draws water from a water source with a mechanical pump mounted to and driven by the vehicle's engine, and heats a portion of that water by routing a heat exchange coil against the vehicle engine exhaust manifold. However, such an arrangement is inherently cumbersome and inefficient, in that the mechanical pump is essentially permanently mounted to the vehicle engine, and the heat transfer is accomplished by the hot exhaust gases heating the metallic exhaust manifold, which heats the metallic heat exchange coil, which heats the flowing water (i.e., an air-to-water heat exchange).

SUMMARY OF THE INVENTION

The hot water camping or other outdoor shower of this invention provides an improved camping shower apparatus utilizing a motor vehicle engine to provide heat for the water. The inventive apparatus is releasably installed on a motor vehicle having an internal combustion engine with an engine block, a heater core with heater controls, at least one engine block/heater core circulation hose, and a battery with a pair of electrical terminals. The apparatus includes a heat exchanger member releasably mounted proximate the engine block and having a pair of primary (engine side) ports and a pair of secondary (shower water side) ports, with the heat exchanger primary ports interposed into the engine block/heater core circulation hose. The apparatus further includes a water source hose having a first end bearing a suction fixture and a screen for immersion into a water source such as a lake or stream, and a second end releasably connected to one of the heat exchanger secondary ports. A shower hose has a first end releasably connected to the other heat exchanger secondary port, and a second end terminating in a shower head. An electric water pump having an intake port and a discharge port is interposed into the water source hose, with the water pump having a pair of electrical leads releasably connected to the vehicle battery terminals.

Thus, the hot water camping shower of this invention utilizes efficient water-to-water heat exchange through the heat exchanger mounted in-line with the vehicle heater core, and delivers the heated shower water with an electric water pump through removable hoses.

BRIEF DESCRIPTION OF THE DRAWINGS

FIG. 1 is a pictorial view of a hot water camping or other outdoor shower apparatus of this invention in a typical installation, illustrating a motor vehicle having an engine block, a heater core with heater controls, first and second engine block/heater core circulation hoses, and a battery with a pair of electrical terminals; the inventive shower apparatus including a heat exchanger member releasably mounted proximate the engine block and having a pair of primary ports and a pair of secondary ports, with the heat exchanger primary ports interposed into one of the engine block/heater core circulation hoses; a water source hose having a first end bearing a suction fixture and a screen and immersed into a water source, and a second end releasably connected to one of the heat exchanger secondary ports; a shower hose having a first end releasably connected to the other heat exchanger secondary port, and a second end terminating in a shower head; and an electric water pump having an intake port and a discharge port interposed into the water source hose between the water source and the heat exchanger, the water pump having a pair of electrical leads releasably connected to the vehicle battery terminals.

DETAILED DESCRIPTION OF A PREFERRED EMBODIMENT

FIG. 1 is a pictorial view of a hot water camping or other outdoor shower apparatus 10 of this invention in a typical installation, illustrating a motor vehicle 12 having an engine block 14, a heater core 16 with heater controls 20, first and second engine block/heater core circulation hoses 20, 22, and a battery 24 with a pair of electrical terminals 26, 28. The inventive shower apparatus includes a heat exchanger member 30 releasably mounted to the vehicle proximate the engine block 14 and having a pair of primary (engine side) ports 32, 34 and a pair of secondary (shower water side) ports 36, 38, with the heat exchanger primary ports 32, 34 interposed into one of the engine block/heater core circulation hoses 20. A water source hose 40 having a first end 42 bearing a suction fixture 44 and a screen 46 is immersed into a water source 48 such as a lake, stream, or even a bucket of water, and has a second end 50 releasably connected to one of the heat exchanger secondary ports 36. A shower hose 52 has a first end 54 releasably connected to the other heat exchanger secondary port 38, and a second end 56 terminating in a shower head 58. An electric water pump 60 has an intake port 62 and a discharge port 64 interposed into the water source hose 40 between the water source 48 and the heat exchanger 30, the water pump having a pair of electrical leads 66, 68 releasably connected to the vehicle battery terminals 26, 28, respectively.

Other features may include the following: The electric pump may include a switch for ease in operation. The pump may be mounted on a board or other structure (as illustrated) for ease in installation and removal, either inside or outside the vehicle. It is desirable to cap the secondary ports of the heat exchanger when the hoses have been removed to prevent debris from entering the heat exchanger. The heat exchanger primary ports are preferably spliced into the heater core hose with hose clamps, while the other hose connections (heat exchanger secondary ports, water pump ports) are preferably screw-type connections for ease of installation and removal.

Typical installation and use instructions might include the following:

The vehicle engine must be cold with the vehicle parking brake set before starting the installation procedure.

The heat exchanger should be installed between one of the two heater core hoses, and connected with hose clamps. Pick a location where you can strap the heat exchanger securely with zip ties (locations may vary). The heat exchanger may be installed in either direction. Remember to leave room for the shower hoses that are to be connected to the heat exchanger for use.

After the location has been picked install the heat exchanger (extra hose may be necessary to use to install heat exchanger in an adequate location).

Next you should check the engine coolant level, then warm the engine to normal operating temperature, inspect the system for leaks and top off the coolant level (if needed).

Each time you connect or disconnect the shower hoses the engine must be off. Connect the hoses as shown in the installation diagram by matching numbers. Screw the hoses on securely, being careful not to burn yourself as the heat exchanger may be hot.

Make sure to keep all hoses away from engine moving parts.

Save the heat exchanger caps to protect the heat exchanger when not in use.

Pick your water source for the shower. The suction fixture must always be submerged in water, with its holes up, so as not to suction air. The suction fixture screen must always be used to protect the pump from damage. Before each use check the screen and make sure it is clean. An extra screen is provided and more can be purchased at a hardware store.

Now you are ready to start the engine. Remember to check the hoses for clearance and warm up the engine to its normal operating temperature.

Place the pump in a location where it will not get wet while the shower is in use.

The heater temperature setting in the vehicle should be on high (the heater fan should be off).

Always stand to one side of the vehicle when using the shower. Make sure the shower head flow control is in the middle setting and the shower head is placed in safe location.

To hook up power to the pump and start the shower flowing, connect the black clip to the negative terminal on the vehicle battery and the red clip to the positive terminal on the battery. The pump should then draw water up and start the shower. If the pump does not prime within two minutes it may be necessary to manually fill the suction hose. To fill the hose you will need to unscrew it from the pump and fill it with water (submerging the hose in a water source is usually adequate), then reconnect it to the pump. The pump will cycle as demand requires.

Water that first comes out of the shower can be extremely hot. Always let it run for a minute to stabilize the temperature and test with your hand before using. This procedure must be done before every shower if the flow has been stopped.

To adjust the water temperature you simply adjust the flow on the shower head; more flow for cooler water, less flow for hotter water.

If the shower water is not warm enough you may need to temporarily raise the vehicle engine idle to increase the flow through the heat exchanger.

Your engine radiator thermostat must be in proper working order for the heat exchanger to work at its full potential.

If the water is too hot you can turn down the vehicle's heater temperature control.

While this invention has been described in connection with preferred embodiments thereof, it is obvious that modifications and changes therein may be made by those skilled in the art to which it pertains without departing from the spirit and scope of the invention. For example, while the preferred embodiment refers to use of the invention as a camping shower, the apparatus is equally applicable to any other outdoor environment such as construction work, military exercises, and the like. Accordingly, the scope of this invention is to be limited only by the appended claims.

What is claimed is:

1. A hot water outdoor shower for use with a motor vehicle having an internal combustion engine with an engine block, a heater core with heater controls, an engine block/heater core circulation hose, and a battery with a pair of electrical terminals; said hot water camping shower comprising:

a heat exchanger member adapted to be releasably mounted proximate said engine block and having a pair of primary ports and a pair of secondary ports, said heat exchanger primary ports adapted to be interposed into said engine block/heater core circulation hose;

a water source hose having a first end for immersion in an external water source, and a second end releasably connected to one of said heat exchanger secondary ports;

a shower hose having a first end releasably connected to the other of said heat exchanger secondary ports, and a second end terminating in a shower head; and an electric water pump having an intake port and a discharge port interposed into said water source hose between said water source and said heat exchanger, said water pump having a pair of electrical leads adapted to be releasably connected to said vehicle battery terminals; wherein when said water source first end is immersed in said external water source and said electric water pump is activated, water flows through said heat exchanger member secondary ports and out through said shower head.

2. The hot water outdoor shower of claim 1 wherein said water source hose first end includes a suction fixture.

3. The hot water outdoor shower of claim 2 wherein said suction function includes a screen.

* * * * *